(12) United States Patent
Nakanishi

(10) Patent No.: US 8,348,434 B2
(45) Date of Patent: Jan. 8, 2013

(54) PROJECTION DISPLAY DEVICE WITH POSITION DETECTION FUNCTION

(75) Inventor: Daisuke Nakanishi, Matsumoto (JP)

(73) Assignee: Seiko Epson Corporation (JP)

( * ) Notice: Subject to any disclaimer, the term of this patent is extended or adjusted under 35 U.S.C. 154(b) by 276 days.

(21) Appl. No.: 12/885,664

(22) Filed: Sep. 20, 2010

(65) Prior Publication Data

US 2011/0109886 A1    May 12, 2011

(30) Foreign Application Priority Data

Nov. 6, 2009  (JP) ................................. 2009-254707

(51) Int. Cl.
*G03B 21/00* (2006.01)
(52) U.S. Cl. ................ 353/70; 353/30; 353/31; 353/38; 353/69; 353/94; 353/102; 348/335
(58) Field of Classification Search ............ 353/30, 353/31, 34, 38, 69, 70, 85, 94, 97, 102, 121; 345/168, 170, 173, 175, 179, 180, 176; 348/335, 348/341, 345–349, E5.03, E5.046; 349/5, 349/7, 8, 9; 356/614–624
See application file for complete search history.

(56) References Cited

U.S. PATENT DOCUMENTS

| | | | |
|---|---|---|---|
| 6,927,384 B2 | 8/2005 | Reime et al. | |
| 7,210,791 B2 * | 5/2007 | Vinson et | 353/69 |
| 7,278,745 B2 * | 10/2007 | Engle | 353/69 |
| 7,325,933 B2 * | 2/2008 | Kaise et al. | 353/97 |
| 7,864,341 B2 * | 1/2011 | Kobayashi | 356/614 |
| 8,038,303 B2 * | 10/2011 | Inoue | 353/70 |
| 8,070,297 B2 * | 12/2011 | Kamijima | 353/69 |
| 2004/0061838 A1 * | 4/2004 | Mochizuki et al. | 353/69 |
| 2005/0046804 A1 * | 3/2005 | Akutsu | 353/70 |
| 2008/0259288 A1 * | 10/2008 | Murata | 353/69 |
| 2009/0091710 A1 * | 4/2009 | Huebner | 353/28 |

FOREIGN PATENT DOCUMENTS

| | | |
|---|---|---|
| JP | 2001-142643 | 5/2001 |
| JP | 2010-198083 | 9/2010 |
| JP | 2010-198548 | 9/2010 |

* cited by examiner

*Primary Examiner* — Georgia Y Epps
*Assistant Examiner* — Sultan Chowdhury
(74) *Attorney, Agent, or Firm* — Harness, Dickey & Pierce, P.L.C.

(57) ABSTRACT

A projection display device having a projection device projecting an image on a surface, and a position detection function of detecting an object's position between the surface and the projection device, includes: a light source emitting light beams toward the object; a light detector detecting the light beams reflected by the object; and a position detector detecting the object's position in an imaginary plane based on the light detector's result, wherein the light source emits, as the light beams, first through third light beams having first through third intensity distributions, the second intensity distribution having a highest intensity at a position failing to overlap a highest intensity of the first intensity distribution, and the third intensity distribution having a highest intensity portion at a position failing to overlap a straight line connecting the highest intensity portions of the first and second intensity distributions.

12 Claims, 10 Drawing Sheets

PROJECTION DISPLAY DEVICE WITH POSITION DETECTION FUNCTION

BACKGROUND

1. Technical Field

The present invention relates to a projection display device with a position detection function, capable of projecting an image and at the same time optically detecting a position of an object matter located on the side from which the image is projected.

2. Related Art

In recent years, display devices with a position detection function each having a touch panel disposed on the front of an image generation device such as a liquid crystal device are used for electronic devices such as cellular phones, car navigation systems, personal computers, ticket-vending machines, or banking terminals, and in such display devices with a position detection function, information is input with reference to an image displayed on the image generation device. Such touch panels are each configured as a position detection device for detecting a position of an object matter in a detection area (see, e.g., FIG. 6 of JP-A-2001-142643 (Document 1)).

The position detection device described in the Document 1 is of an optical type, and has a configuration of setting a detection area on the side of the display surface for displaying an image in the direct view display device, and having a plurality of light emitting diodes and a plurality of photo transistors disposed on both sides across the detection area. In such a position detection device, if the object matter enters inside the detection area, the light is blocked by the object matter, and therefore, by identifying the phototransistors the light to which is blocked, the position of the object matter can be detected.

Further, there is proposed a position detection device having a translucent plate disposed on the side of input operations with respect to a direct view display panel such as a liquid crystal panel, and a light source and a light receiving element disposed on the side opposite to the side of input operations with respect to the translucent plate (see, e.g., U.S. Pat. No. 6,927,384 (Document 2)).

In such a position detection device described in the Document 2, the position detection light emitted from the light source is emitted toward the side of input operations via the translucent plate, and the position detection light reflected by the object matter is received by the light receiving element.

SUMMARY

Here, the inventors of the present patent application propose a projection display device with a position detection function for displaying an image on a screen member, and at the same time detecting the position of an object matter on the front (the side of the screen surface) of the screen member.

However, when configuring the projection display device with a position detection function described above, if the configuration described in the Document 1 is adopted, a number of light emitting diodes and phototransistors are disposed around the screen member as a result, which is not practicable.

Further, in the projection display device with a position detection function, since it is not actually possible to dispose the translucent plate, the light source, and the light receiving element on the front side of the screen member, it is not achievable to adopt the configuration described in the Document 2.

An advantage of some aspects of the invention is to provide a projection display device with a position detection function capable of optically detecting the position of the object matter between a surface on which an image is projected and an image projection device without disposing the light source adjacent to the surface on which the image is projected.

According to an aspect of the invention, there is provided a projection display device having an image projection device adapted to project an image on a surface, and a position detection function of optically detecting a position of an object matter located between the surface and the image projection device, the projection display device including a position detection light source section disposed in the image projection device, and adapted to emit position detection light beams toward the object matter, a light detector adapted to detect the position detection light beams reflected by the object matter, and a position detection section adapted to detect the position of the object matter in an imaginary plane intersecting emission directions of the position detection light beams based on a light reception result of the light detector, wherein the position detection light source section emits, as the position detection light beams, a first position detection light beam having a first intensity distribution, a second position detection light beam having a second intensity distribution having a highest intensity portion at a position failing to overlap a highest intensity portion of the first intensity distribution viewed from the image projection device, and a third position detection light beam having a third intensity distribution having a highest intensity portion at a position failing to overlap an imaginary straight line connecting the highest intensity portion of the first intensity distribution and the highest intensity portion of the second intensity distribution viewed from the image projection device.

In this aspect of the invention, when configuring the projection display device with a position detection function by adding the position detection function to the projection display device, the position detection light source section for emitting the position detection light beams toward the object matter located between the surface on which the image is projected and the image projection device is provided, and the position detection light beams reflected by the object matter are detected by the light detector. Here, the position detection light source section emits, as the position detection light beams, the first position detection light beam with the first intensity distribution, the second position detection light beam with the second intensity distribution having the highest intensity portion at a position failing to overlap the highest intensity portion of the first intensity distribution viewed from the image projection device, and the third position detection light beam with the third intensity distribution having the highest intensity portion at a position failing to overlap the imaginary straight line connecting the highest intensity portion of the first intensity distribution and the highest intensity portion of the second intensity distribution viewed from the image projection device. Therefore, by using the two position detection light beams out of the first position detection light beam, the second position detection light beam, and the third position detection light beam, and two position detection light beams of another combination, the position detection section can detect the position of the object matter in the imaginary plane intersecting in the emission directions of the position detection light beams based on the light reception result of the light detector. For example, by using the detection result of the first position detection light beam reflected by the object matter in the light detector and the detection result of the second position detection light beam reflected by the object matter in the light detector, the ratio of the distance from the highest intensity portion of the first intensity distribution to the object matter and the distance from the highest intensity portion of the second intensity distribution to the object matter can be obtained. Further, by using the detection result of the second position detection light beam reflected by the object matter in the light detector and the detection result of the third position detection light beam reflected by the object matter in the light detector, the ratio of the distance from the highest intensity portion of the second intensity distribution to the object matter and the distance from the highest intensity portion of the third intensity distribution to the object matter can be obtained. Therefore, the position corresponding to these ratios can be detected as the position of the object matter. Therefore, the position of the object matter between the surface on which the image is projected and the image projection device can optically be detected with a relatively simple configuration. Further, since the position detection light source section is disposed in the image projection device, by setting the projection direction of the image, the emission direction of the position detection light beams can be set simultaneously.

In this aspect of the invention, it is preferable that in each of the first intensity distribution, the second intensity distribution, and the third intensity distribution, the intensity decreases monotonically as distance from the highest intensity portion increases. According to such a configuration as described above, it is possible to detect the position of the object matter with accuracy with a relatively easy and simple process.

In this aspect of the invention, it is preferable that the position detection light source section emits the first position detection light beam, the second position detection light beam, and the third position detection light beam at respective timing different from each other. In this aspect of the invention, it is possible to emit the first position detection light beam, the second position detection light beam, and the third position detection light beam simultaneously if the wavelengths of the first position detection light beam, the second position detection light beam, and the third position detection light beam are made different from each other. Even in this case, it is possible to detect each of the first position detection light beam, the second position detection light beam, and the third position detection light beam. In this case, the light detector for selectively detecting the first position detection light beam, the second position detection light beam, and the third position detection light beam becomes necessary. However, since the first position detection light beam, the second position detection light beam, and the third position detection light beam can be detected by the same light detector by emitting the first position detection light beam, the second position detection light beam, and the third position detection light beam at respective timing different from each other, simplification of the configuration can be achieved.

In this aspect of the invention, it is preferable that the position detection light beams are made of infrared light. According to the configuration described above, there can be obtained an advantage that the position detection light beams do not disturb the display of the image.

In this aspect of the invention, it is preferable that the position detection light source section includes a first light source adapted to emit the first position detection light beam, a second light source adapted to emit the second position detection light beam, and a third light source adapted to emit the third position detection light beam. In this aspect of the invention, it is possible to emit the first position detection light beam, the second position detection light beam, and the third position detection light beam from a common light source. In this case, by adopting the configuration of switching the direction in which the position detection light beams are emitted from the common light source, or the configuration of disposing the light blocking mask having a translucent section for forming the intensity distribution on the front of the common light source and switching the position of the mask, the first position detection light beam, the second position detection light beam, and the third position detection light beam are emitted as a result. Therefore, if the position detection light source section is provided with the first light source for emitting the first position detection light beam, the second light source for emitting the second position detection light beam, and the third light source for emitting the third position detection light beam, the first position detection light beam, the second position detection light beam, and the third position detection light beam can be emitted by lighting the first, second, and third light sources, and therefore, simplification of the configuration can be achieved.

In this aspect of the invention, it is preferable that the first light source, the second light source, and the third light source emit the first position detection light beam, the second position detection light beam, and the third position detection light beam as diverging light beams. By adopting the configuration described above, the position corresponding to the light axis becomes the highest intensity portion of the intensity distribution, and the intensity distribution in which the intensity is reduced monotonically as the distance from the highest intensity portion increases can be formed.

In this aspect of the invention, it is preferable that a detection area where the object matter is detected is set between the surface on which the image is projected and the image projection device, and the first light source, the second light source, and the third light source have respective light axes oriented in directions passing through ends of the detection area. If the position corresponding to the light axis becomes the highest intensity portion of the intensity distribution, the contour lines of the intensity are formed in a concentric fashion in the periphery of the highest intensity portion, and as a result, an area with equal intensity occurs in the periphery of the highest intensity portion. In such a case, the process of discriminating which side of the highest intensity portion the object matter is located on becomes necessary. However, in the case in which the light axes of the first light source, the second light source, and the third light source pass through the ends of the detection area, such a circumstance can be avoided, and therefore, the position of the object matter can be detected with a simple process.

In this aspect of the invention, it is preferable that a fourth light source adapted to emit a fourth position detection light beam having an intensity distribution different from those of the first position detection light beam, the second position detection light beam, and the third position detection light beam is further provided, and the position detection section detects the position of the object matter in the emission direction of the position detection light beam based at least on a light reception result of the light detector when emitting the fourth position detection light beam. By adopting the configuration described above, a three-dimensional coordinate of the object matter can be detected.

In this case, it is preferable that the fourth light source is disposed in the image projection device. According to this configuration, by setting the projection direction of the image, the emission direction of the fourth position detection light beam can be set simultaneously.

In this aspect of the invention, it is also possible to adopt a configuration of disposing the fourth light source in a place other than the image projection device.

In this aspect of the invention, it is preferable that the position detection light source section, the light detector, and the position detection section are all disposed in the image projection device. According to this configuration, since the constituents necessary for the position detection are disposed in the image projection device, the device is convenient for transfer, and at the same time, the direction of the optical axis of the light detector can be adjusted by adjusting the direction of the image projection device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
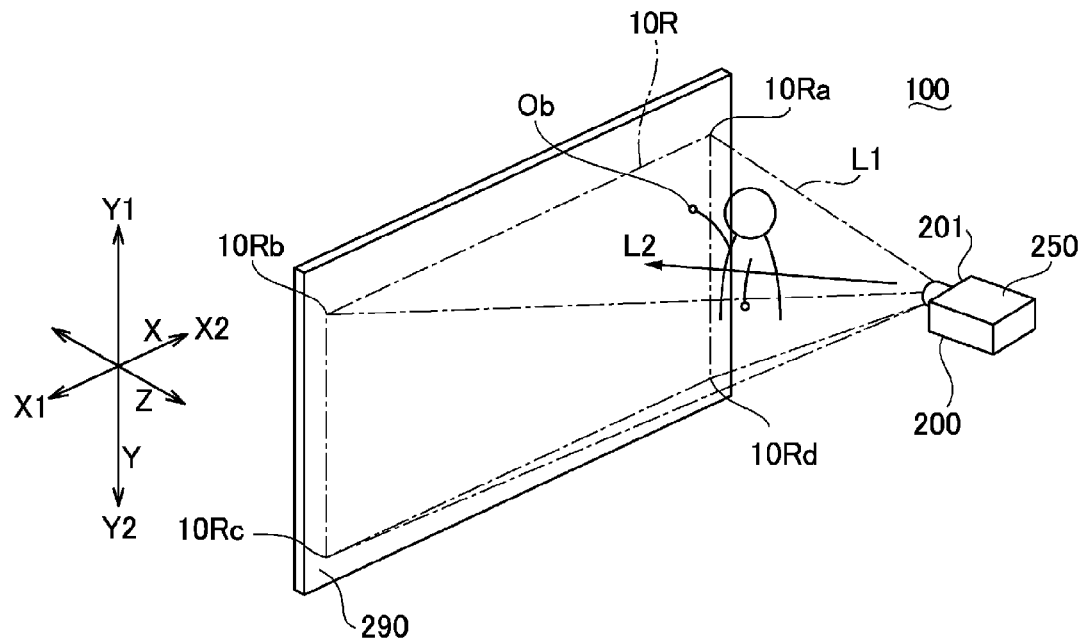
FIGS. 1A and 1B are explanatory diagrams schematically showing a configuration of a projection display device with a position detection function according to a first embodiment of the invention.

Hereinafter, some embodiments of the invention will be explained in detail with reference to the accompanying drawings. It should be noted that in the explanation described below it is assumed that X-axis, Y-axis, and Z-axis intersect with each other, and images are projected in a direction along the Z-axis. Further, in the drawings referred to below, things are displayed with the X-axis oriented in the lateral direction, and the Y-axis oriented in the vertical direction for the sake of convenience of explanation. Further, in the drawings referred to below, things are shown assuming one side of the X-axis direction as an X1 side, the other side thereof as an X2 side, one side of the Y-axis direction as a Y1 side, and the other side thereof as a Y2 side. Further, in the drawings referred to in the description below, the scale ratios of the members are set differently in order for illustrating the members with sizes which can be recognized in the drawings.

First Embodiment

Figure 1B:
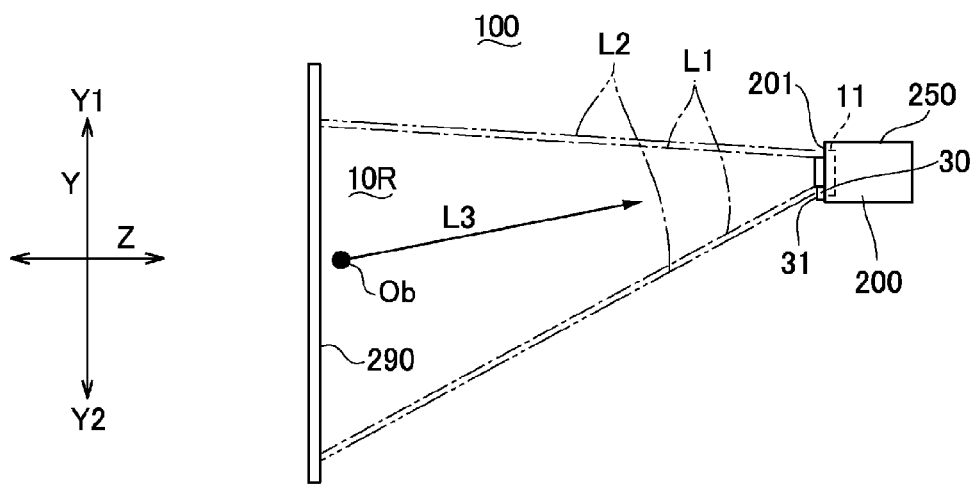

Overall Configuration of Projection Display Device with Position Detection Function FIGS. 1A and 1B are explanatory diagrams schematically showing a configuration of a projection display device with a position detection function according to a first embodiment of the invention, wherein FIG. 1A is an explanatory diagram schematically showing an appearance of a substantial part of the projection display device with a position detection function viewed from obliquely above, and FIG. 1B is an explanatory diagram schematically showing an appearance thereof viewed from a lateral side.

The projection display device 100 with a position detection function shown in FIG. 1 is provided with a liquid crystal projector or an image projection device 200 called a digital micromirror device, and the image projection device 200 projects an image display light beam L1 in an enlarged manner from a projection lens 210 provided to a front surface section 201 of a housing 250 toward a screen member 290. Therefore, the image projection device 200 has an optical device (not shown) inside the housing 250 for generating a color image display light beam and emitting it via the projection lens 210. In the present embodiment, the screen member 290 has a rectangular, landscape shape.

Configuration of Optical Position Detection Device

Figure 2A:
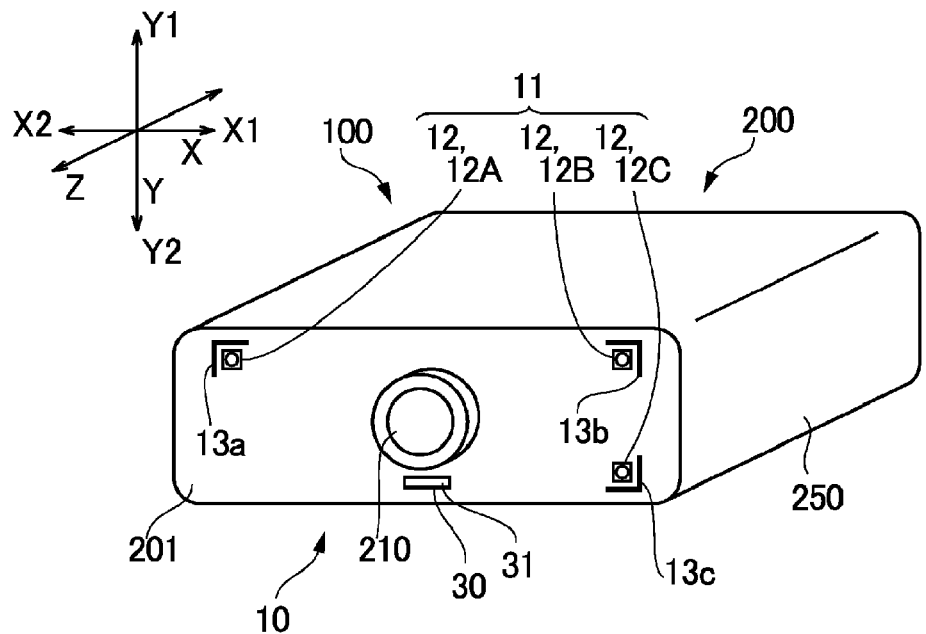
FIGS. 2A and 2B are explanatory diagrams of an optical position detection device used for the projection display device with a position detection function according to the first embodiment of the invention.
Figure 2B:
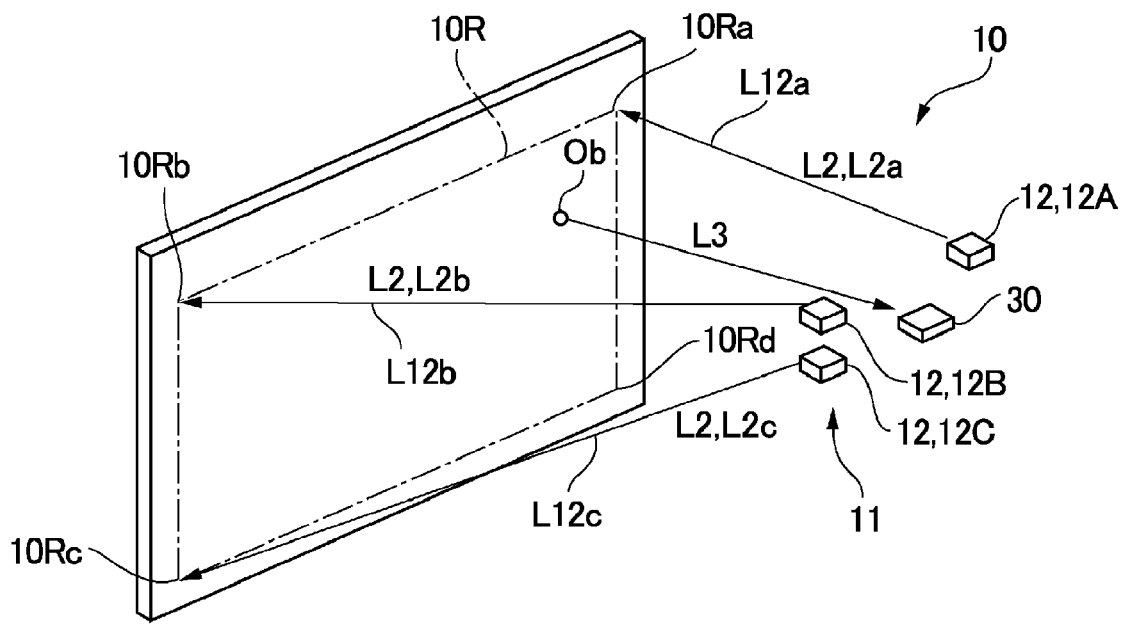
Figure 3:
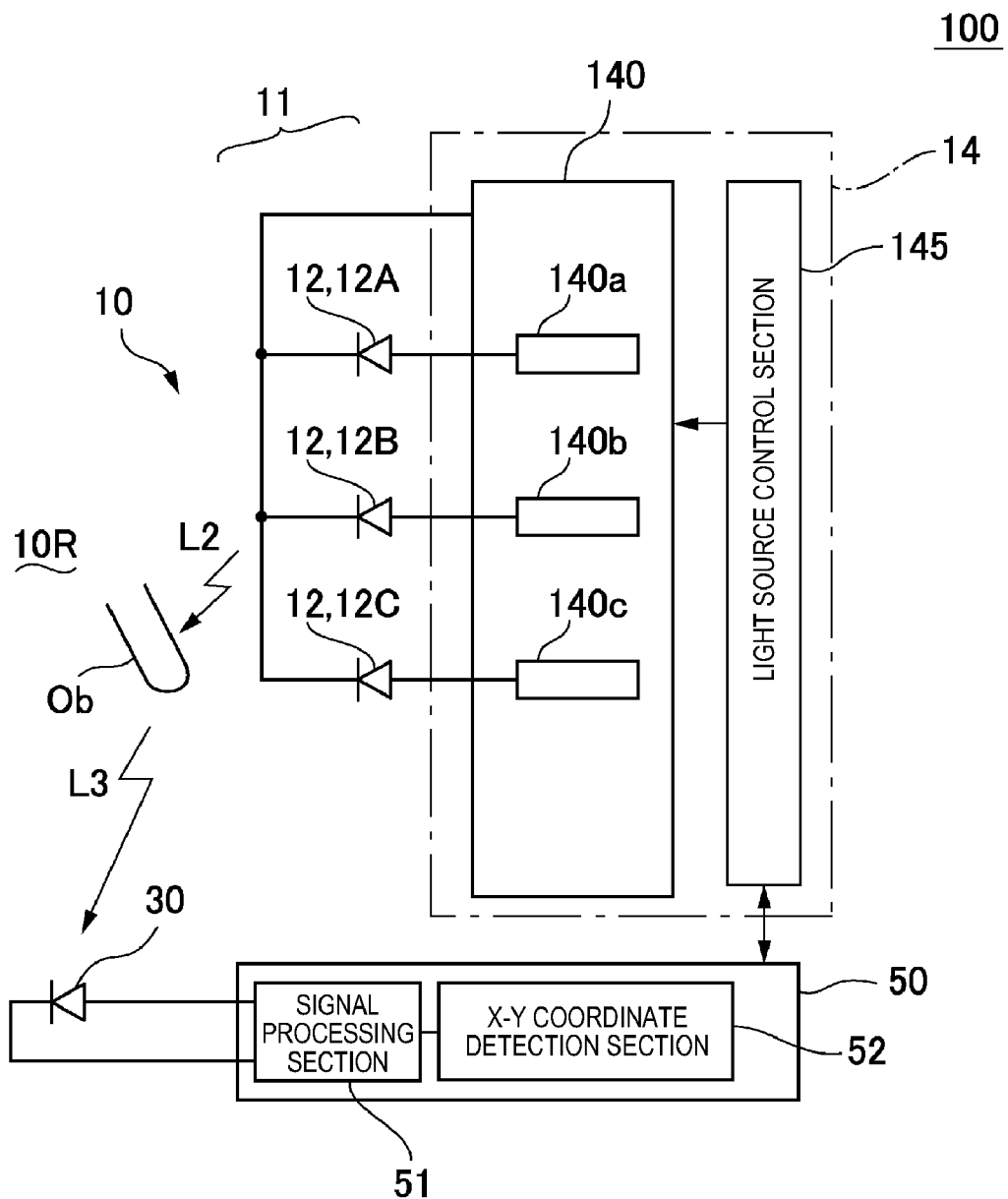
FIG. 3 is an explanatory diagram showing an electrical configuration of the optical position detection device used for the projection display device with a position detection function according to the first embodiment of the invention.

FIGS. 2A and 2B are explanatory diagrams of an optical position detection device used in the projection display device 100 with a position detection function according to the first embodiment of the invention, wherein FIG. 2A is an explanatory diagram of an image projection device viewed from a front surface side, and FIG. 2B is an explanatory diagram showing an overall configuration of the position detection device. FIG. 3 is an explanatory diagrams showing an electrical configuration of the optical position detection device used in the projection display device 100 with a position detection function according to the first embodiment of the invention.

As described below, the projection display device 100 with a position detection function according to the present embodiment is provided with an optical position detection device 10 for optically detecting the position of the object matter Ob inside a detection area 10R set between the screen member 290 as the surface on which an image is projected, and the image projection device 200.

As shown in FIGS. 2A, 2B, and 3, the optical position detection device 10 is provided with a position detection light source section 11 disposed in the image projection device 200, and the position detection light source section 11 emits a position detection light beam L2 made of infrared light toward the detection area 10R. Further, the optical position detection device 10 is provided with a light detector 30 and a position detection section 50, wherein the light detector 30 detects a position detection light beam L3 reflected by the object matter Ob in the detection area 10R. The position detection section 50 is provided with a signal processing section 51 and an X-Y coordinate detection section 52, and detects the position of the object matter Ob based on the detection result in the light detector 30. The optical position detection device 10 configured as described above detects the position (the X coordinate and the Y coordinate) of the object matter Ob in an imaginary plane (the X-Y plane) intersecting the emission directions of the position detection light beams L2.

The position detection light source section 11 has a plurality of light emitting elements 12 (a first light emitting element 12A, a second light emitting element 12B, and a third light emitting element 12C) as a light source, and a light source drive section 14 for driving these light emitting elements 12. On the front surface section 201 of the image projection device 200 there is disposed a projection lens 210 at an approximately central position in the X-axis direction, and at the same time, there are disposed the light emitting elements 12 at positions sandwiching the projection lens 210 on both sides in the X-axis direction on the front surface section 201. The light emitting elements 12 are each formed of a light emitting diode (LED) or the like, and each discharge the position detection light beam L2 formed of infrared light as a diverging light beam. In other words, since the position detection light beams L2 each preferably have a wavelength range efficiently reflected by the object matter Ob such as a finger or a stylus pen, if the object matter Ob is a human body such as a finger, the position detection light beams L2 are preferably infrared light beams (in particular near infrared light beams near the visible light region with a wavelength of, for example, around 850 nm or 950 nm) having high reflectance on a surface of a human body. In the present embodiment, either of the light emitting elements 12 emits an infrared light beam having a peak wavelength in the wavelength band around 850 nm.

The light source drive section 14 is provided with a light source drive circuit 140 for driving the light emitting elements 12 and a light source control section 145 for controlling the emission intensity of each of the plurality of light emitting elements 12 via the light source drive circuit 140. The light source drive circuit 140 is provided with a light source drive circuit 140a for driving the first light emitting element 12A as a first light source, a light source drive circuit 140b for driving the second light emitting element 12B as a second light source, and a light source drive circuit 140c for driving the third light emitting element 12C as a third light source. The light source control section 145 controls the light emitting elements 12 via the light source drive circuits 140a through 140c. The light source control section 145 and the position detection section 50 are connected to each other with a signal line, and the drive of the light emitting elements 12 and the detection operation in the position detection section 50 are performed in conjunction with each other.

In the present embodiment, similarly to the position detection light source section 11, the light detector 30 and the position detection section 50 are also provided to the image projection device 200, and the position detection section 50 is disposed inside the image projection device 200.

The light detector 30 is disposed on the front surface section 201 of the image projection device 200 on one side of the Y-axis direction with respect to the projection lens 210, and has a light receiving section 31 facing to the detection area 10R. The light detector 30 is composed of, for example, a photodiode, a phototransistor, or the like, and in the present embodiment, a photodiode is used therefor. The light detector 30 is electrically connected to the position detection section 50, and the detection result in the light detector 30 is output to the position detection section 50.

Configuration of Intensity Distribution of Position Detection Light Beam L2

Figure 4A:
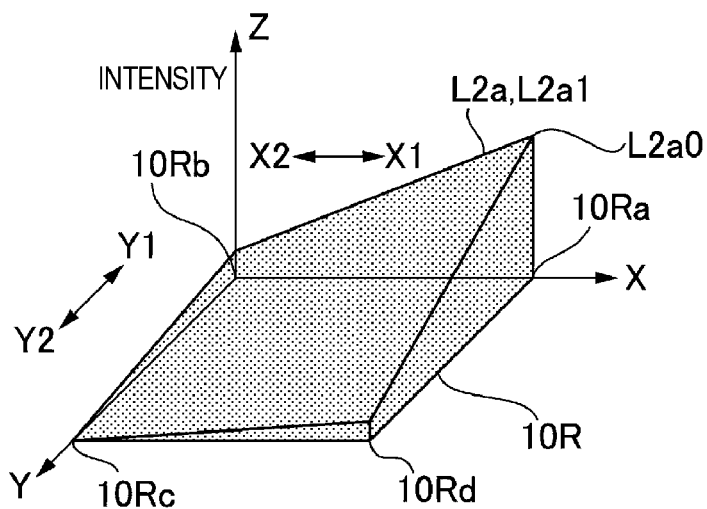
FIGS. 4A through 4C are explanatory diagrams of an intensity distribution of position detection light used in the optical position detection device used for the projection display device with a position detection function according to the first embodiment of the invention.
Figure 4B:
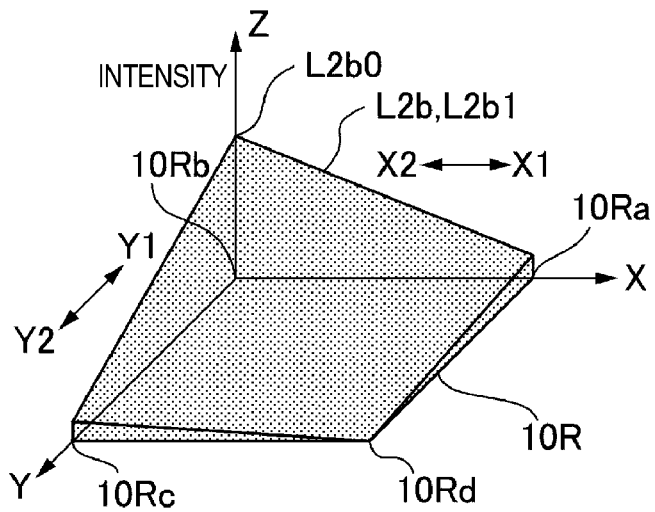
Figure 4C:
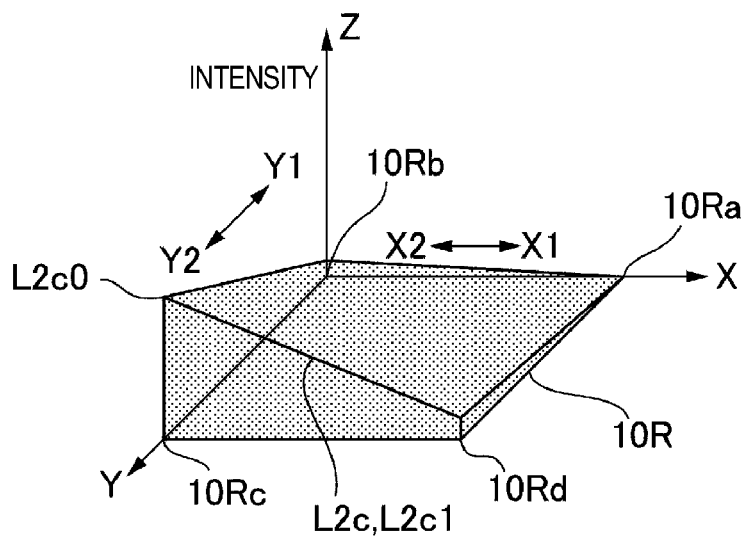

FIGS. 4A through 4C are explanatory diagrams of the intensity distributions of the position detection light beams used in the optical position detection device used in the projection display device 100 with a position detection function according to the first embodiment of the invention, wherein FIG. 4A is an explanatory diagram of a first intensity distribution formed by the first position detection light beam, FIG. 4B is an explanatory diagram of a second intensity distribution formed by the second position detection light beam, and FIG. 4C is an explanatory diagram of a third intensity distribution formed by the third position detection light beam.

In the optical position detection device 10 according to the present embodiment, the position detection light source section 11 is provided with a plurality of light emitting elements 12 (the first light emitting element 12A, the second light emitting element 12B, and the third light emitting element 12C), and all of these light emitting elements 12 have the light axes L12a, L12b, and L12c oriented toward the side where the rectangular detection area 10R is located when viewed from the image projection device 200. In the present embodiment, all of the plurality of light emitting elements 12 has the light axes L12a, L12b, and L12c oriented toward the end sections of the detection area 10R. More specifically, the light axis L12a of the first light emitting element 12A passes through the corner portion 10Ra out of the four corner portions 10Ra through 10Rd of the detection area 10R, the light axis L12b of the second light emitting element 12B passes through the corner portion 10Rb of the detection area 10R, and the light axis L12c of the third light emitting element 12C passes through the corner portion 10Rc of the detection area 10R. Further, the first position detection light beam L2a emitted from the first light emitting element 12A, the second position detection light beam L2b emitted from the second light emitting element 12B, and the third position detection light beam L2c emitted from the third light emitting element 12C are all diverging light beams, and in these diverging light beams the intensity is the highest in the vicinities of the light axes L12a, L12b, and L12c, and is continuously lowered as the distances from the light axes L12a, L12b, and L12c increase.

Therefore, the first position detection light beam L2a emitted from the first light emitting element 12A forms a first intensity distribution L2a1 shown in FIG. 4A in the detection area 10R. In such a first intensity distribution L2a1, the highest intensity portion L2a0 of the first intensity distribution L2a1 appears in the corner portion 10Ra through which the light axis L12a passes, and the intensity decreases monotonically as the distance from the highest intensity portion L2a0 increases. In the first intensity distribution L2a1 according to the present embodiment, the intensity decreases substantially linearly as the distance from the highest intensity portion L2a0 increases. Further, the second position detection light beam L2b emitted from the second light emitting element 12B forms a second intensity distribution L2b1 shown in FIG. 4B in the detection area 10R. In such a second intensity distribution L2b1, the highest intensity portion L2b0 of the second intensity distribution L2b1 appears in the corner portion 10Rb through which the light axis L12b passes, and the intensity decreases monotonically as the distance from the highest intensity portion L2b0 increases. In the second intensity distribution L2b1 according to the present embodiment, the intensity decreases substantially linearly as the distance from the highest intensity portion L2b0 increases. Further, the third position detection light beam L2c emitted from the third light emitting element 12C forms a third intensity distribution L2c1 shown in FIG. 4C in the detection area 10R. In such a third intensity distribution L2c1, the highest intensity portion L2c0 of the third intensity distribution L2c1 appears in the corner portion 10Rc through which the light axis L12c passes, and the intensity decreases monotonically as the distance from the highest intensity portion L2c0 increases. In the third intensity distribution L2c1 according to the present embodiment, the intensity decreases substantially linearly as the distance from the highest intensity portion L2c0 increases.

Here, the highest intensity portion L2a0 of the first intensity distribution L2a1 and the highest intensity portion L2b0 of the second intensity distribution L2b1 are shifted from each other in the X-axis direction, and are located at positions not overlapping each other viewed from the image projection device 200. Further, when viewed from the image projection device 200, the highest intensity portion L2c0 of the third intensity distribution L2c1 is located at a position not overlapping an imaginary line connecting the highest intensity portion L2b0 of the second intensity distribution L2b1 and the highest intensity portion L2a0 of the first intensity distribution L2a1. In other words, the highest intensity portion L2a0 of the first intensity distribution L2a1, the highest intensity portion L2b0 of the second intensity distribution L2b1, and the highest intensity portion L2c0 of the third intensity distribution L2c1 are located respectively at the corner portions of an imaginary triangle. Therefore, the first intensity distribution L2a1, the second intensity distribution L2b1, and the third intensity distribution L2c1 have intensity gradients with respective directions different from each other.

In the first intensity distribution L2a1, the second intensity distribution L2b1, and the third intensity distribution L2c1 configured as described above, it is preferable that the intensity level of the intensity distribution formed in the detection area 10R is high. Therefore, in the present embodiment, as shown in FIG. 2A, the three light emitting elements 12 (the first light emitting element 12A, the second light emitting element 12B, and the third light emitting element 12C) are respectively provided with reflecting mirrors 13a through 13c for guiding the position detection light beams to be transmitted outward of the detection area 10R out of the position detection light beams L2 emitted from the light emitting elements 12 inside the detection area 10R. In the present embodiment, the reflecting mirrors 13a through 13c extend from lateral positions of the light emitting elements 12 toward the emission direction of the position detection light beams L2 with a shape corresponding to the shape on the detection area 10R to which the light axes (the light axes L12a, L12b, and L12c of the first light emitting element 12A, the second light emitting element 12B, and the third light emitting element 12C) of the light emitting elements 12. More specifically, the reflecting mirrors 13a through 13c are each provided with two reflecting surfaces parallel to the light axis of the corresponding light emitting element 12 in two directions perpendicular to each other out of the four directions surrounding the light axis.

Fundamental Principle of Coordinate Detection

In the projection display device 100 with a position detection function according to the present embodiment, the light emitting elements 12 are lit in the position detection light source section 11 to form the intensity distributions of the position detection light beams L2 in the detection area 10R, and at the same time, the position detection light beams L2 reflected by the object matter Ob are detected with the light detector 30, and then the position detection section 50 detects the position of the object matter Ob in the detection area 10R based on the detection result in the light detector 30. Therefore, the principle of the coordinate detection will be explained with reference to FIGS. 5A and 5B.

Figure 5A:
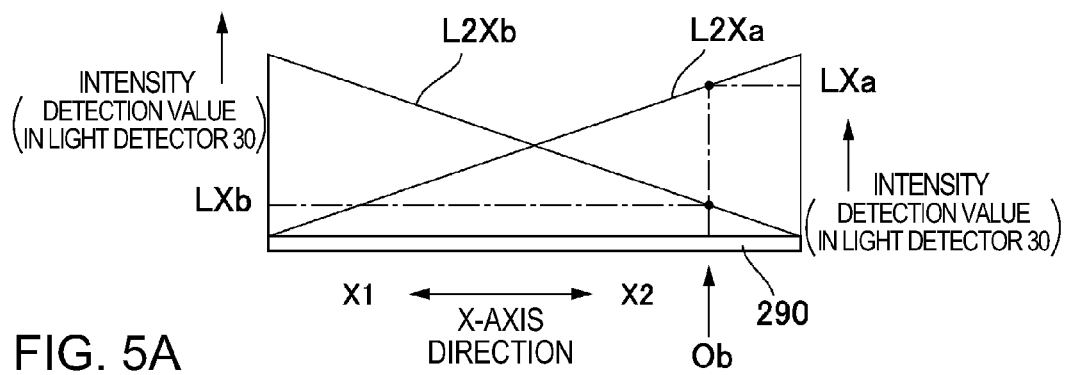
FIGS. 5A and 5B are explanatory diagrams schematically showing the principle of the optical position detection device of the projection display device with a position detection function according to the first embodiment of the invention.
Figure 5B:
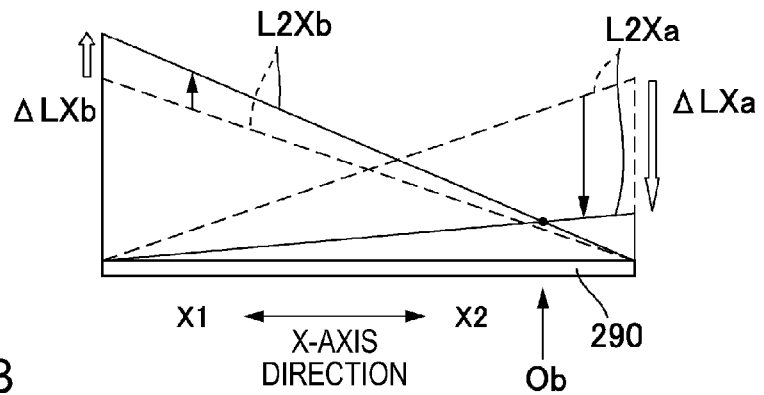

FIGS. 5A and 5B are explanatory diagrams schematically showing the principle of the optical position detection device 10 of the projection display device 100 with a position detection function according to the first embodiment of the invention, wherein FIG. 5A is an explanatory diagram showing the intensity of the position detection light beam reflected by the object matter, and FIG. 5B is an explanatory diagram showing how the intensity distributions of the position detection light beams are controlled so that the intensities of the position detection light beams reflected by the object matter become equal to each other.

In the projection display device 100 with a position detection function according to the present embodiment, when the first light emitting element 12A and the second light emitting element 12B in the position detection light source section 11 are lit sequentially to emit the first position detection light beam L2a and the second position detection light beam L2b, the first intensity distribution L2a1 and the second intensity distribution L2b1 shown in FIGS. 4A and 4B are formed sequentially. In the explanation presented below, since the highest intensity portion L2a0 of the first intensity distribution L2a1 and the highest intensity portion L2b0 of the second intensity distribution L2b1 are identical in the position in the Y-axis direction, and shifted from each other in the X-axis direction, it is assumed that the component in the X-axis direction in the first intensity distribution L2a1 is a first X-coordinate detection intensity distribution L2Xa, and the component in the X-axis direction in the second intensity distribution L2b1 is a second X-coordinate detection intensity distribution L2Xb.

In order for detecting the position in the X-axis direction (X coordinate) using the first X-coordinate detection intensity distribution L2Xa and the second X-coordinate detection intensity distribution L2Xb, firstly in a first period, the first light emitting element 12A is lit while putting off the second light emitting element 12B to thereby form the first X-coordinate detection intensity distribution L2Xa with the intensity monotonically decreasing in a direction toward one side X1 of the X-axis direction from the other side X2 thereof as shown in FIG. 5A. Subsequently, in a second period, the second light emitting element 12B is lit while putting off the first light emitting element 12A to thereby form the second X-coordinate detection intensity distribution L2Xb with the intensity monotonically decreasing from the one side X1 of the X-axis direction toward the other side X2 thereof. Therefore, when the object matter Ob is disposed in the detection area 10R, the object matter Ob reflects the first position detection light beam L2a and the second position detection light beam L2b, and the light detector 30 detects some of the reflected light beams. Here, since the first X-coordinate detection intensity distribution L2Xa formed in the first period and the second X-coordinate detection intensity distribution L2Xb formed in the second period each have a constant distribution, it is possible to detect the X-coordinate of the object matter Ob based on the detection result in the light detector 30 using the following method.

For example, the X-coordinate of the object matter Ob is detected based on the adjustment value having been used when adjusting the control value (the drive current value) with respect to the light emitting elements 12 so that the detection value LXa in the light detector 30 when forming the first X-coordinate detection intensity distribution L2Xa in the first period and the detection value LXb in the light detector 30 when forming the second X-coordinate detection intensity distribution L2Xb in the second period become equal to each other. In such a method as described in FIG. 5B, it is understood that if the detection value LXa in the light detector 30 in the first period and the detection value LXb in the light detector 30 in the second period are equal to each other, the distance from the highest intensity portion L2a0 of the first intensity distribution L2a1 to the object matter Ob and the distance from the highest intensity portion L2b0 of the second intensity distribution L2b1 to the object matter Ob shown in FIGS. 4A through 4C are equal to each other.

In contrast thereto, in the case in which the detection value LXa in the light detector 30 in the first period and the detection value LXb in the light detector 30 in the second period are different from each other, the control values (the drive current values) to the first light emitting element 12A and the second light emitting element 12B are adjusted so that the detection values LXa and LXb become equal to each other, and as shown in FIG. 5B, the first X-coordinate detection intensity distribution L2Xa is formed again in the first period, and the second X-coordinate detection intensity distribution L2Xb is formed again in the second period. If the detection value LXa in the light detector 30 in the first period and the detection value LXb in the light detector 30 in the second period become equal to each other as a result, the ratio between the adjustment value ΔLXa of the control value to the first light emitting element 12A in the first period and the adjustment value ΔLXb of the control value to the second light emitting element 12B in the second period corresponds to the ratio of the amounts of the displacement of the object matter Ob from the midpoint between the highest intensity portion L2a0 of the first intensity distribution L2a1 and the highest intensity portion L2b0 of the second intensity distribution L2b1 shown in FIGS. 4A and 4B. Further, the ratio between the control value to the first light emitting element 12A in the first period and the control value to the second light emitting element 12B in the second period when the detection value LXa in the light detector 30 in the first period and the detection value LXb in the light detector 30 in the second period become equal to each other corresponds to the ratio of the distance from the highest intensity portion L2a0 of the first intensity distribution L2a1 to the object matter Ob and the distance from the highest intensity portion L2b0 of the second intensity distribution L2b1 to the object matter Ob shown in FIGS. 4A and 4B. Therefore, since the ratio between the distance from the highest intensity portion L2a0 of the first intensity distribution L2a1 to the object matter Ob and the distance from the highest intensity portion L2b0 of the second intensity distribution L2b1 to the object matter Ob can be obtained, the X-coordinate of the object matter Ob can be detected.

It should be noted that in the case in which the detection value LXa in the light detector 30 in the first period and the detection value LXb in the light detector 30 in the second period are different from each other, it is also possible to, for example, reduce the control value to the first light emitting element 12A in the first period as much as the adjustment value ΔLXa, or alternatively increase the control value to the second light emitting element 12B in the second period as much as the adjustment value ΔLXb. If, in consequence, the detection value LXa in the light detector 30 in the first period and the detection value LXb in the light detector 30 in the second period become equal to each other, the ratio between the control value to the first light emitting element 12A in the first period after adjusting the control value and the control value to the second light emitting element 12B in the second period after adjusting the control value corresponds to the ratio between the distance from the highest intensity portion L2a0 of the first intensity distribution L2a1 to the object matter Ob and the distance from the highest intensity portion L2b0 of the second intensity distribution L2b1 to the object matter Ob shown in FIGS. 4A and 4B. Therefore, since the ratio between the distance from the highest intensity portion L2a0 of the first intensity distribution L2a1 to the object matter Ob and the distance from the highest intensity portion L2b0 of the second intensity distribution L2b1 to the object matter Ob can be obtained, the X-coordinate of the object matter Ob can be detected.

In either of the cases of adopting the respective methods described above, by performing the process described above by sequentially lighting the light emitting elements 12 distant from each other in the Y-axis direction such as the second light emitting element 12B and the third light emitting element 12C in the third period and the fourth period in a similar manner, the Y-coordinate of the object matter Ob can be detected.

When obtaining the position information of the object matter Ob in the detection area 10R based on the detection result in the light detector 30 as described above, it is also possible to adopt a configuration of, for example, using a microprocessor unit (MPU) as the light source control section 145 and the position detection section 50, and thus executing a predetermined software (an operation program) by the microprocessor unit, thereby performing the process. Further, as described below with reference to FIGS. 6A and 6B, it is also possible to adopt a configuration of performing the process with a signal processing section using hardware such as a logic circuit.

Configuration Example of Position Detection Section 50

Figure 6A:
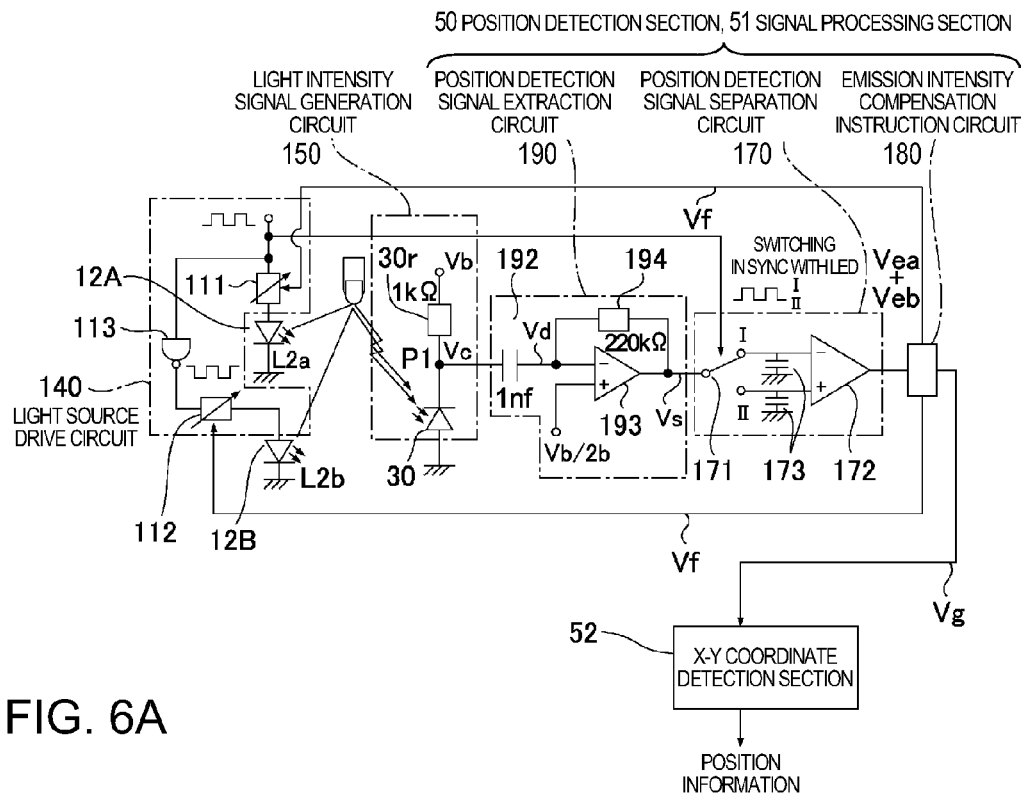
FIGS. 6A and 6B are explanatory diagrams showing the content of signal processing in the projection display device with a position detection function according to the first embodiment of the invention.
Figure 6B:
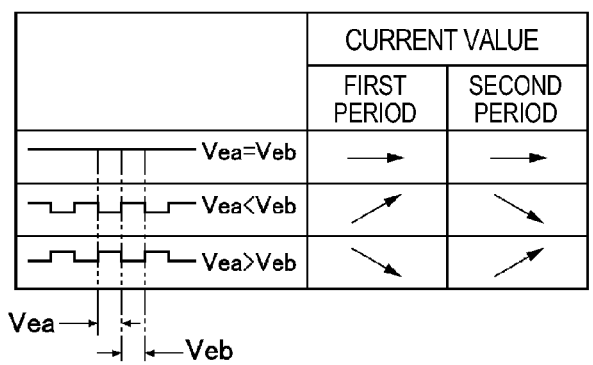

FIGS. 6A and 6B are explanatory diagrams showing a content of the signal processing in the projection display device 100 with a position detection function according to the first embodiment of the invention, wherein FIG. 6A is an explanatory diagram of the position detection section 50 of the projection display device 100 with a position detection function to which the invention is applied, and FIG. 6B is an explanatory diagram showing a content of the process in an emission intensity compensation instruction section of the position detection section 50. Among the methods explained above with reference to FIGS. 5A and 5B, the position detection section 50 described here adopts the method of detecting the X-coordinate of the object matter Ob based on the adjustment values or the control values when adjusting the control values (the drive current values) to the first light emitting element 12A and the second light emitting element 12B so that the detection values LXa and LXb in the light detector 30 in the first period and the second period, respectively are equal to each other. It should be noted that since the configurations for respectively detecting the X-coordinate and the Y-coordinate are substantially the same, the case of obtaining the X-coordinate will only be explained in the following description.

As shown in FIG. 6A, in the projection display device 100 with a position detection function, the light source drive circuit 140 is represented as being arranged to apply a drive pulse with a predetermined current value to each of the plurality of light emitting elements 12 via a variable resistor 111 in the first period, and apply a drive pulse with a predetermined current value to each of the plurality of light emitting elements 12 via a variable resistor 112 and an inverting circuit 113 in the second period. Therefore, the light source drive circuit 140 is arranged to apply the drive pulses with phases reverse to each other to the light emitting elements 12 in the first period and the second period, respectively. Further, the light beam, which is the first position detection light beam L2a when forming the first X-coordinate detection intensity distribution L2Xa reflected by the object matter Ob, is received by the common light detector 30 in the first period, and the light beam, which is the second position detection light beam L2b when forming the second X-coordinate detection intensity distribution L2Xb reflected by the object matter Ob, is received by the common light detector 30 in the second period. In a light intensity signal generation circuit 150, a resistor 30r with a resistance of about 1 kΩ is connected to the light detector 30 in series, and a bias voltage Vb is applied between both ends thereof.

In such a light intensity signal generation circuit 150, the position detection section 50 is electrically connected to the connection point P1 of the light detector 30 and the resistor 30r. A detection signal Vc output from the connection point P1 of the light detector 30 and the resistor 30r is expressed by the following formula.

$$Vc = V30/(V30+\text{(resistance value of the resistor } 30r))$$
$V30$: an equivalent resistance of the light detector 30

Therefore, in comparison between the case in which the environment light does not enter the light detector 30 and the case in which the environment light enters the light detector 30, the level and the amplitude of the detection signal Vc become greater in the case in which the environment light enters the light detector 30.

The position detection section 50 is mainly composed of a position detection signal extraction circuit 190, a position detection signal separation circuit 170, and the emission intensity compensation instruction circuit 180. It should be noted that the emission intensity compensation instruction circuit 180 also functions as a part of the light source control section 145 shown in FIG. 3.

The position detection signal extraction circuit 190 is provided with a filter 192 formed of a capacitor of about 1 nF, and the filter 192 functions as a high-pass filter for removing a direct-current component from the signal output from the connection point P1 of the light detector 30 and the resistor 30r. Therefore, due to the filter 192, the position detection signal Vd of the position detection light beams L2 detected by the light detector 30 in the first period and the second period can be extracted from the detection signal Vc output from the connection point P1 of the light detector 30 and the resistor 30r. Therefore, since the intensity of the environment light can be regarded as constant during a certain period of time while the position detection light beams L2 are modulated, the low-frequency component or the direct-current component caused by the environment light can be removed by the filter 192.

Further, the position detection signal extraction circuit 190 has an adder circuit 193 provided with a feedback resistor 194 of about 220 kΩ in the posterior stage of the filter 192, and the position detection signal Vd extracted by the filter 192 is output to the position detection signal separation circuit 170 as a position detection signal Vs obtained by superimposing the position detection signal Vd on a voltage V/2 half as large as the bias voltage Vb.

The position detection signal separation circuit 170 is provided with a switch 171 for performing a switching operation in sync with the drive pulse applied to the light emitting elements 12 in the first period, a comparator 172, and capacitors 173 electrically connected respectively to input lines of the comparator 172. Therefore, when the position detection signal Vs is input to the position detection signal separation circuit 170, the position detection signal separation circuit 170 outputs the effective value Vea of the position detection signal Vs in the first period and the effective value Veb of the position detection signal Vs in the second period alternately to the emission intensity compensation instruction circuit 180.

The emission intensity compensation instruction circuit 180 compares the effective values Vea and Veb with each other to perform the process shown in FIG. 6B, and outputs the control signal Vf to the light source drive circuit 140 so that the effective value Vea of the position detection signal Vs in the first period and the effective value Veb of the position detection signal Vs in the second period have the same level to thereby control the light source drive circuit 140. In other words, the emission intensity compensation instruction circuit 180 compares the effective value Vea of the position detection signal Vs in the first period and the effective value Veb of the position detection signal Vs in the second period with each other, and then keeps the present drive condition if they are equal to each other. In contrast thereto, if the effective value Vea of the position detection signal Vs in the first period is lower than the effective value Veb of the position detection signal Vs in the second period, the emission intensity compensation instruction circuit 180 makes the resistance value of the variable resistor 111 be reduced to thereby increase the intensity of the light emitted from the first light emitting element 12A in the first period. Further, if the effective value Veb of the position detection signal Vs in the second period is lower than the effective value Vea of the position detection signal Vs in the first period, the emission intensity compensation instruction circuit 180 makes the resistance value of the variable resistor 112 be reduced to thereby increase the intensity of the light emitted from the second light emitting element 12B in the second period.

In such a manner as described above, the projection display device 100 with a position detection function controls the control value (the current value) of each of the first light emitting element 12A and the second light emitting element 12B using the emission intensity compensation instruction circuit 180 of the position detection section 50 so that the detection amounts by the light detector 30 in the first period and the second period become the same. Therefore, since the information regarding the control values to the light emitting elements 12, with which the effective value Vea of the position detection signal Vs in the first period and the effective value Veb of the position detection signal Vs in the second period have the same level, exists in the emission intensity compensation instruction circuit 180, by outputting the information to the X-Y coordinate detection section 52 as the position detection signal Vg, it is possible for the X-Y coordinate detection section 52 to obtain the X-coordinate of the object matter Ob in the detection area 10R. Further, by using the same principle, the X-Y coordinate detection section 52 can obtain the Y-coordinate of the object Ob in the detection area 10R.

Further, in the present embodiment, the filter 192 removes the direct-current component caused by the environment light from the detection signal Vc output from the connection point P1 of the light detector 30 and the resistor 30r to thereby extract the position detection signal Vd in the position detection signal extraction circuit 190. Therefore, even in the case in which the detection signal Vc output from the connection point P1 of the light detector 30 and the resistor 30r includes the signal component due to the infrared component of the environment light, the influence of such environment light can be canceled.

X-Y Coordinate Detection Operation

Figure 7A:
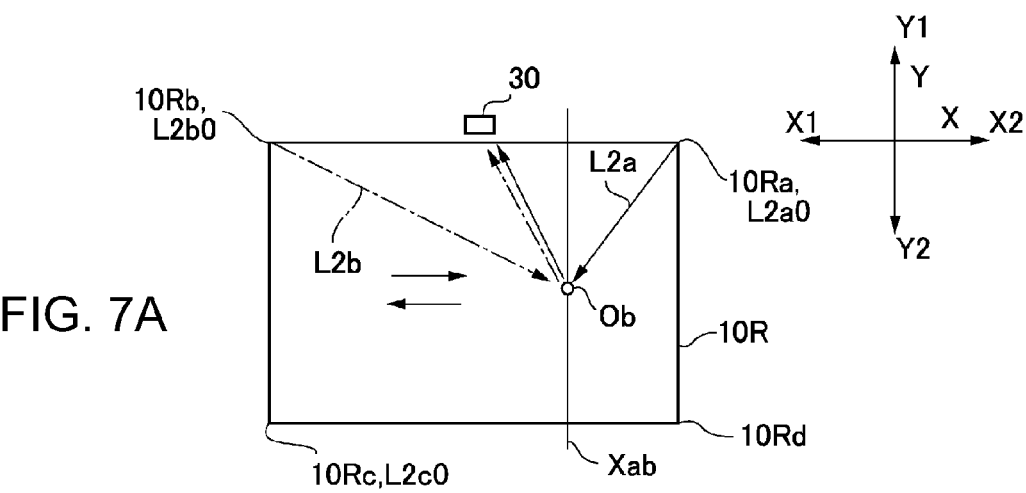
FIGS. 7A through 7C are explanatory diagrams showing the operation of detecting X-Y coordinate in the projection display device 100 with a position detection function according to the first embodiment of the invention.
Figure 7B:
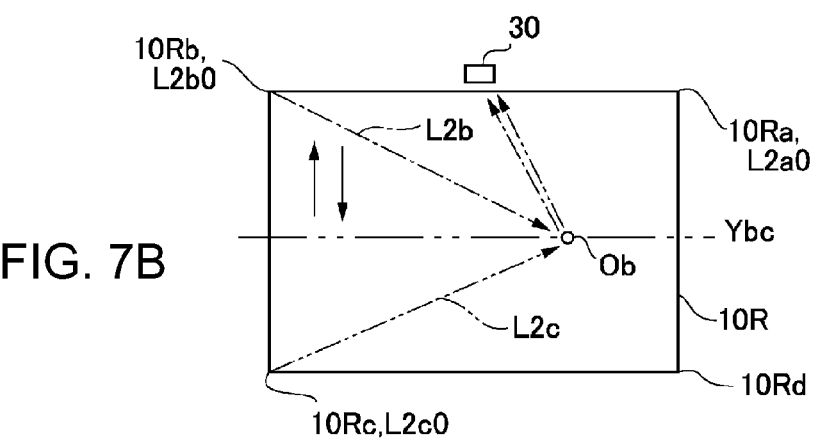
Figure 7C:
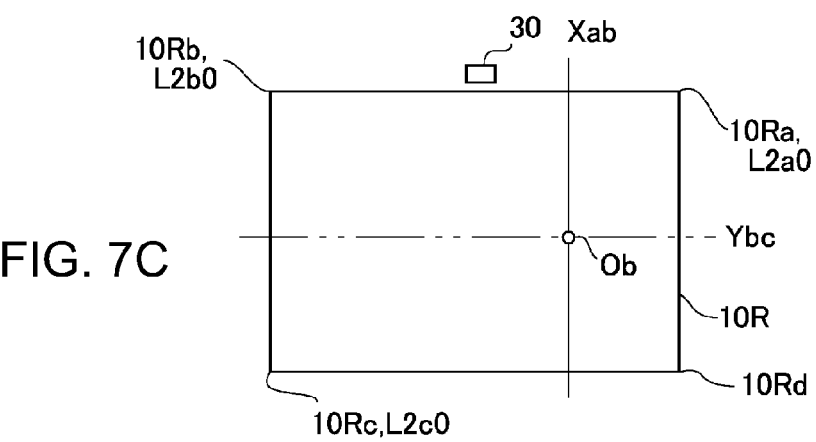

The operation of detecting the position of the object matter Ob in the detection area 10R in the projection display device 100 with a position detection function according to the present embodiment will specifically be explained with reference to FIGS. 2A, 2B, 4A through 4C, and 7A through 7C. FIGS. 7A through 7C are explanatory diagrams showing the operation of detecting the X-Y coordinate in the projection display device 100 with a position detection function according to the first embodiment of the invention.

In the projection display device 100 with a position detection function according to the present embodiment, in order for detecting the X-Y coordinate of the object matter Ob in the detection area 10R, the X-coordinate is detected using the first period and the second period described below, and the Y-coordinate is detected using the third period and the fourth period.

In the projection display device 100 with a position detection function according to the present embodiment, in order for detecting the X-coordinate of the object matter Ob in the detection area 10R, firstly, the first light emitting element 12A is lit while the second light emitting element 12B and the third light emitting element 12C are put off in the first period to thereby form the first intensity distribution L2a1 shown in FIG. 4A. Subsequently, in the second period, the second light emitting element 12B is lit while the first light emitting element 12A and the third light emitting element 12C are put off to thereby form the second intensity distribution L2b1 shown in FIG. 4B. If the detection value in the light detector 30 in the first period and the detection value in the light detector 30 in the second period are equal to each other as a result, it is understood that the distance from the highest intensity portion L2a0 of the first intensity distribution L2a1 shown in FIG. 4A to the object matter Ob and the distance from the highest intensity portion L2b0 of the second intensity distribution L2b1 shown in FIG. 4B to the object matter Ob are equal to each other.

In contrast thereto, in the case in which the detection value in the light detector 30 in the first period and the detection value in the light detector 30 in the second period are different from each other, the control values (the drive current values) to the first light emitting element 12A and the second light emitting element 12B are adjusted so that these detection values become equal to each other, and the first intensity distribution L2a1 is formed again in the first period, and the second intensity distribution L2b1 is formed again in the second period. If the detection value in the light detector 30 in the first period and the detection value in the light detector 30 in the second period become equal to each other as a result, then the ratio between the adjustment value of the control value to the first light emitting element 12A in the first period and the adjustment value of the control value to the second light emitting element 12B in the second period is obtained. Alternatively, the ratio between the control value to the first light emitting element 12A in the first period and the control value to the second light emitting element 12B in the second period when the detection value in the light detector 30 in the first period and the detection value in the light detector 30 in the second period become equal to each other is obtained. Since these ratios correspond to the ratio between the distance from the highest intensity portion L2a0 of the first intensity distribution L2a1 shown in FIG. 4A to the object matter Ob and the distance from the highest intensity portion L2b0 of the second intensity distribution L2b1 shown in FIG. 4B, it is understood that the object matter Ob exists on the line Xab shown in FIG. 7A.

Subsequently, in order for detecting the Y-coordinate of the object matter Ob in the detection area 10R, firstly, the second light emitting element 12B is lit while the first light emitting element 12A and the third light emitting element 12C are put off in the third period to thereby form the second intensity distribution L2b1 shown in FIG. 4B. Subsequently, in the fourth period, the third light emitting element 12C is lit while the first light emitting element 12A and the second light emitting element 12B are put off to thereby form the third intensity distribution L2c1 shown in FIG. 4C. If the detection value in the light detector 30 in the third period and the detection value in the light detector 30 in the fourth period are equal to each other as a result, it is understood that the distance from the highest intensity portion L2b0 of the second intensity distribution L2b1 shown in FIG. 4B to the object matter Ob and the distance from the highest intensity portion L2c0 of the third intensity distribution L2c1 shown in FIG. 4C to the object matter Ob are equal to each other.

In contrast thereto, in the case in which the detection value in the light detector 30 in the third period and the detection value in the light detector 30 in the fourth period are different from each other, the control values (the drive current values) to the second light emitting element 12B and the third light emitting element 12C are adjusted so that these detection values become equal to each other, and the second intensity distribution L2b1 is formed again in the third period, and the third intensity distribution L2c1 is formed again in the fourth period. If the detection value in the light detector 30 in the third period and the detection value in the light detector 30 in the fourth period become equal to each other as a result, then the ratio between the adjustment value of the control value to the second light emitting element 12B in the third period and the adjustment value of the control value to the third light emitting element 12C in the fourth period is obtained. Further, the ratio between the control value to the second light emitting element 12B in the third period and the control value to the third light emitting element 12C in the fourth period when the detection value in the light detector 30 in the third period and the detection value in the light detector 30 in the fourth period become equal to each other is obtained. Since these ratios correspond to the ratio between the distance from the highest intensity portion L2b0 of the second intensity distribution L2b1 shown in FIG. 4B to the object matter Ob and the distance from the highest intensity portion L2c0 of the third intensity distribution L2c1 shown in FIG. 4C, it is understood that the object matter Ob exists on the line Ybc shown in FIG. 7B.

By obtaining the coordinate of the intersection of the lines Xab, Ybc as shown in FIG. 7C after obtaining the lines Xab, Ybc in such a manner as described above, the X-Y coordinate of the object matter Ob can be obtained. It should be noted that although in the present embodiment the first light emitting element 12A is lit in the first period, the second light emitting element 12B is lit in the second and third periods, and the third light emitting element 12C is lit in the third period, the X-Y coordinate of the object matter Ob can also be obtained similarly even if other combinations are adopted.

It should be noted that although in the present embodiment the highest intensity portion L2a0 of the first intensity distribution L2a1, the highest intensity portion L2b0 of the second intensity distribution L2b1, and the highest intensity portion L2c0 of the third intensity distribution L2c1 exist at the corner portions 10Ra, 10Rb, and 10Rc of the detection area 10R, respectively, it is possible to locate some or all of the highest intensity portions L2a0, L2b0, and L2c0 inside the detection area 10R, and even in such a configuration the X-Y coordinate of the object matter Ob can similarly be obtained using the method described above.

Further, it is also possible that some or all of the highest intensity portion L2a0 of the first intensity distribution L2a1, the highest intensity portion L2b0 of the second intensity distribution L2b1, and the highest intensity portion L2c0 of the third intensity distribution L2c1 exist outside the detection area 10R, and even in such a configuration the X-Y coordinate of the object matter Ob can similarly be obtained using the method described above.

Major Advantages of Present Embodiment

As described hereinabove, in the present embodiment when configuring the projection display device 100 with a position detection function by adding the position detection function to the projection display device, the position detection light source section 11 for emitting the position detection light beams formed of infrared light toward the detection area 10R is provided, and the light detector 30 detects the position detection light beam L3 reflected by the object matter Ob in the detection area 10R. Here, the position detection light beam L2 emitted from the position detection light source section 11 forms the intensity distribution in the detection area 10R, and the X-Y coordinate of the object matter Ob is optically detected using the intensity distribution. Therefore, according to the present embodiment, the position detection section 50 can optically detect the X-Y coordinate of the object matter Ob based on the light reception result of the light detector 30 without disposing the light source adjacent to the surface (the screen member 290) on which the image is projected.

Further, as the position detection light beams L2, the position detection light source section 11 emits the first position detection light beam L2a with the first intensity distribution L2a1, the second position detection light beam L2b with the second intensity distribution L2b1 having the highest intensity portion L2b0 at a position shifted from the position of the highest intensity portion L2a0 of the first intensity distribution L2a1, and the third position detection light beam L2c with the third intensity distribution L2c1 having the highest intensity portion L2c0 at a position shifted from the imaginary straight line connecting the two highest intensity portions L2a0, L2b0. Therefore, by using two position detection light beams out of the first position detection light beam L2a, the second position detection light beam L2b, and the third position detection light beam L2c, and two position detection light beams of another combination, the position detection section 50 can detect the X-Y coordinate of the object matter Ob based on the reception result of the light detector 30. Therefore, the position of the object matter Ob between the screen member 290 and the image projection device 200 can optically be detected with a relatively simple configuration. Further, since the position detection light beams L2 are each formed of infrared light, there is an advantage that the position detection light beams L2 do not disturb displaying the image.

Further, in the first intensity distribution L2a1, the second intensity distribution L2b1, and the third intensity distribution L2c1, the intensity is monotonically reduced as the distance from the highest intensity portions L2a0, L2b0, and L2c0 increases. In particular in the present embodiment, in the first intensity distribution L2a1, the second intensity distribution L2b1, and the third intensity distribution L2c1, the intensity is monotonically reduced substantially linearly as the distance from the highest intensity portions L2a0, L2b0, and L2c0 increases. Therefore, it is possible to detect the position of the object matter Ob with accuracy with a relatively easy and simple process.

Further, the position detection light source section 11 emits the first position detection light beam L2a, the second position detection light beam L2b, and the third position detection light beam L2c at respective timing different from each other. Therefore, even if the wavelengths of the first position detection light beam L2a, the second position detection light beam L2b, and the third position detection light beam L2c are equal to each other, the first position detection light beam L2a, the second position detection light beam L2b, and the third position detection light beam L2c can be detected by the same light detector 30, and therefore, simplification of the configuration can be achieved.

Further, the position detection light source section 11 is provided with the first light emitting element 12A for emitting the first position detection light beam L2a, the second light emitting element 12B for emitting the second position detection light beam L2b, and the third light emitting element 12C for emitting the third position detection light beam L2c. Therefore, since it is possible to emit the first position detection light beam L2a, the second position detection light beam L2b, and the third position detection light beam L2c at predetermined timing by lighting the first light emitting element 12A, the second light emitting element 12B, and the third light emitting element 12C, simplification of the configuration can be achieved. Moreover, the first light emitting element 12A, the second light emitting element 12B, and the third light emitting element 12C are each a light emitting diode, and emit infrared light beams each made of a diverging light beam. Therefore, each of the positions corresponding to the light axes L12a, L12b, and L12c becomes the highest intensity portion of the intensity distribution, and the intensity distribution in which the intensity is reduced monotonically as the distance from the highest intensity portion increases can easily be formed.

Further, the first light emitting element 12A, the second light emitting element 12B, and the third light emitting element 12C have the light axes L12a, L12b, and L12c oriented along the directions passing through the ends of the detection area 10R, respectively. Therefore, since in the first intensity distribution L2a1, the second intensity distribution L2b1, and the third intensity distribution L2c1, it is possible to avoid the case in which the portions with the same intensity are caused around the highest intensity portions L2a0, L2b0, and L2c0, the position of the object matter Ob can be detected by the simple and easy process.

Further, in the present embodiment, all of the position detection light source section 11, the light detector 30, and the position detection section 50 are disposed in the image projection device 200. Therefore, since the constituents necessary for the position detection are all disposed in the image projection device 200, the device is convenient for transfer, and at the same time, the direction of the optical axis of the light detector 30 can be adjusted by adjusting the direction of the image projection device 200.

Further, the position detection light source section 11 emits the position detection light beams from the front surface section 201 where the projection lens 210 for projecting the image in the image projection device 200 is located. Therefore, the emission direction of the image display light beam L1 and the position detection light beams L2 can be adjusted only by adjusting the direction to which the front surface section 201 of the image projection device 200 faces. Further, similarly to the position detection light source section 11, the light detector 30 is also disposed on the front surface section 201 of the image projection device 200. Therefore, it is possible to surely direct the light detector 30 to the same direction of the image display light beam and the position detection light beams. Therefore, it is possible to adjust the emission direction of the image display light beam and the position detection light beams and the direction along which the center of the optical axis of the light detector 30 is oriented only by adjusting the direction to which the front surface section 201 of the image projection device 200 faces.

Second Embodiment

Figure 8A:
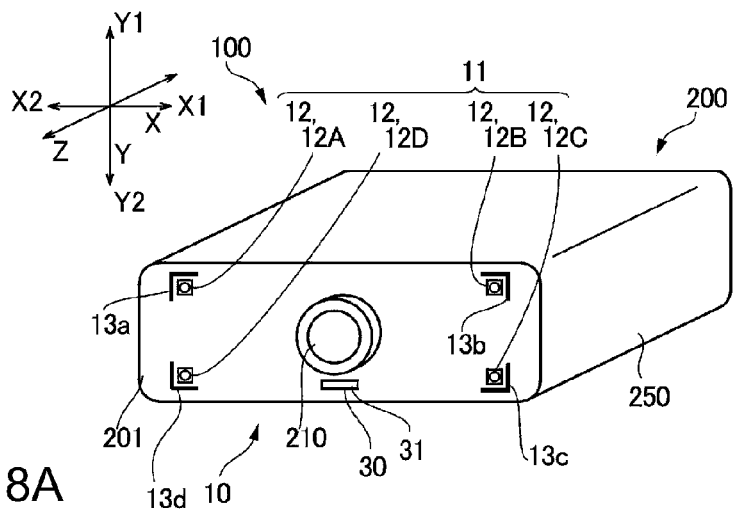
FIGS. 8A through 8C are explanatory diagrams of an optical position detection device 10 used for a projection display device with a position detection function according to a second embodiment of the invention.
Figure 8B:
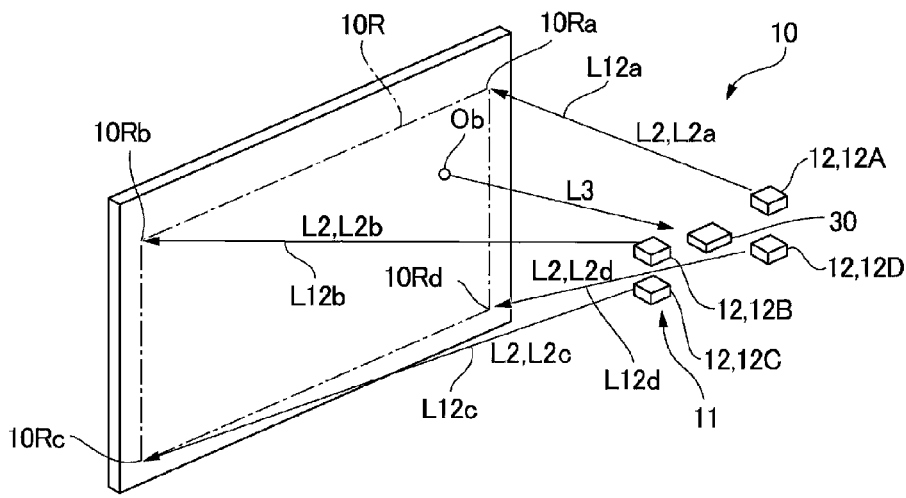
Figure 8C:
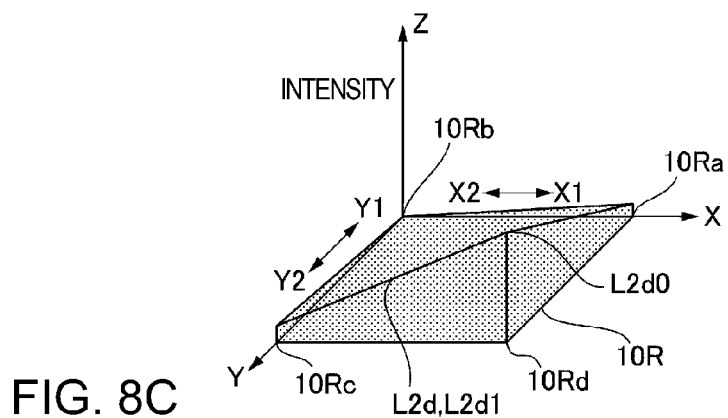

FIGS. 8A through 8C are explanatory diagrams of the optical position detection device 10 used in the projection display device 100 with a position detection function according to a second embodiment of the invention, wherein FIG. 8A is an explanatory diagram of the image projection device 200 viewed from the front surface side, FIG. 8B is an explanatory diagram showing an overall configuration of the optical position detection device 10, and FIG. 8C is an explanatory diagram of the intensity distribution of the position detection light beam emitted from a fourth light emitting element. It should be noted that since the basic configuration of the present embodiment is substantially the same as in the first embodiment, common parts are denoted with the same reference symbols and the explanation therefor will be omitted.

Although in the first embodiment described above the position detection light source section 11 emits the first position detection light beam L2a, the second position detection light beam L2b, and the third position detection light beam L2c as the position detection light beams L2, in the present embodiment, the position detection light source section 11 further emits the fourth position detection light beam L2d having an intensity varying in the emission direction (the Z-axis direction) of the position detection light beams L2 to thereby form a Z-coordinate detection intensity distribution. More specifically, as shown in FIGS. 8A and 8B, the position detection light source section 11 is provided with a fourth light emitting element 12D for emitting the fourth position detection light beam L2d. Such a fourth light emitting element 12D has the light axis L12d1 oriented toward a corner portion 10Rd of the detection area 10R, and when viewed from the image projection device 200, the light axes L12a1, L12b1, L12c1, and L12d1 are oriented in the respective angular directions different from each other. Therefore, as shown in FIG. 8C, the fourth position detection light beam L2d emitted from the position detection light source section 11 forms the intensity distribution L2d1 having the highest intensity portion L2d0 at the corner portion 10Rd of the detection area 10R, and when viewed from the image projection device 200, the highest intensity portions L2a0, L2b0, L2c0, and L2d0 of the first position detection light beam L2a, the second position detection light beam L2b, the third position detection light beam L2c, and the fourth position detection light beam L2d are located at positions not overlapping each other. It should be noted that the fourth light emitting element 12D is also provided with a reflecting mirror 13d for guiding the position detection light beam L2d to be transmitted outward of the detection area 10R to the inside of the detection area 10R.

In the position detection light source section 11 having such a configuration as described above, when lighting all of the first light emitting element 12A, the second light emitting element 12B, and the third light emitting element 12C, and additionally lighting the fourth light emitting element 12D, as a result of combination of the first intensity distribution L2a1, the second intensity distribution L2b1, the third intensity distribution L2c1 shown in FIGS. 4A through 4C, and the fourth intensity distribution L2d1, the position detection light beams having an intensity varying in the emission direction (the Z-axis direction) of the position detection light beams L2 are emitted. The intensity of the position detection light beams thus combined as described above monotonically varies in the Z-axis direction on the one hand, and is kept constant in the X-axis direction and the Y-axis direction on the other hand. Therefore, by receiving the position detection light beam reflected by the object matter Ob with the light detector 30, the position detection section 50 can detect the Z-coordinate based on the detection result of the light detector 30. Therefore, the XYZ coordinate of the object matter Ob between the screen member 290 and the image projection device 200 can optically be detected with a relatively simple configuration.

Such detection of the Z-coordinate can be used for setting the predetermined range in the Z-axis direction in the detection area 10R as an effective detection area. For example, by setting the range within 5 cm from the surface of the screen member 290 as the effective detection area, if the object matter Ob is detected at a position with the distance from the surface of the screen member 290 exceeding 5 cm, the detection result can be invalidated. Therefore, the process of assuming the X-Y coordinate of the object matter Ob as an input only when the object matter Ob is detected within the range of equal to or further than 5 cm from the surface of the screen member 290, for example, can be performed.

Modified Example of Second Embodiment

Although in the second embodiment the Z-coordinate is detected while simultaneously lighting the first light emitting element 12A, the second light emitting element 12B, the third light emitting element 12C, and the fourth light emitting element 12D, it is also possible to detect the Z-coordinate based on the result obtained by adding the detection values of the light detector 30 while sequentially lighting the first light emitting element 12A, the second light emitting element 12B, the third light emitting element 12C, and the fourth light emitting element 12D.

Third Embodiment

Although in the second embodiment the Z-coordinate is detected using all of the first position detection light beam L2a, the second position detection light beam L2b, the third position detection light beam L2c, and the fourth position detection light beam L2d, the configuration of detecting the Z-coordinate using either one of the first position detection light beam L2a, the second position detection light beam L2b, and the third position detection light beam L2c, and the fourth position detection light beam L2d will be explained.

Figure 9A:
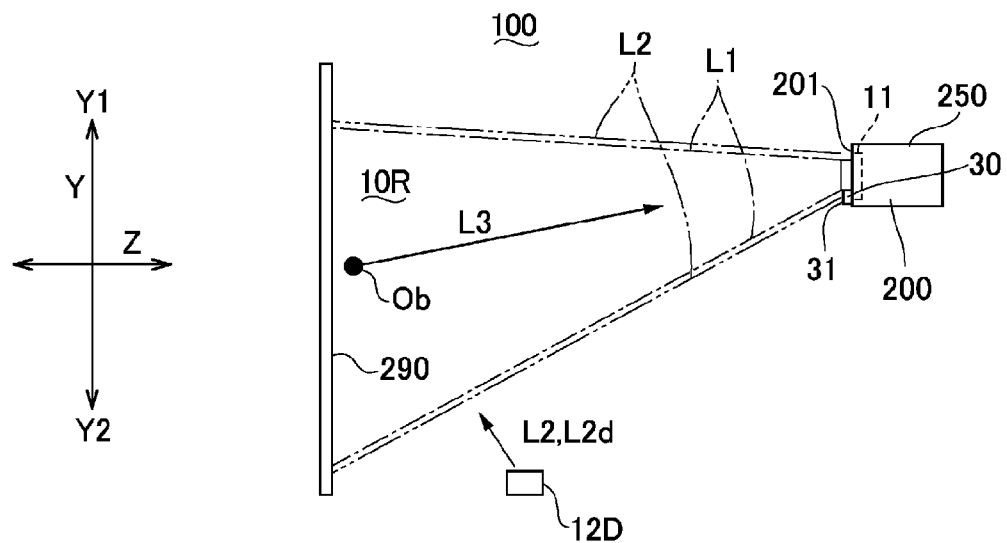
FIGS. 9A and 9B are explanatory diagrams schematically showing a configuration of a projection display device with a position detection function according to a third embodiment of the invention.
Figure 9B:
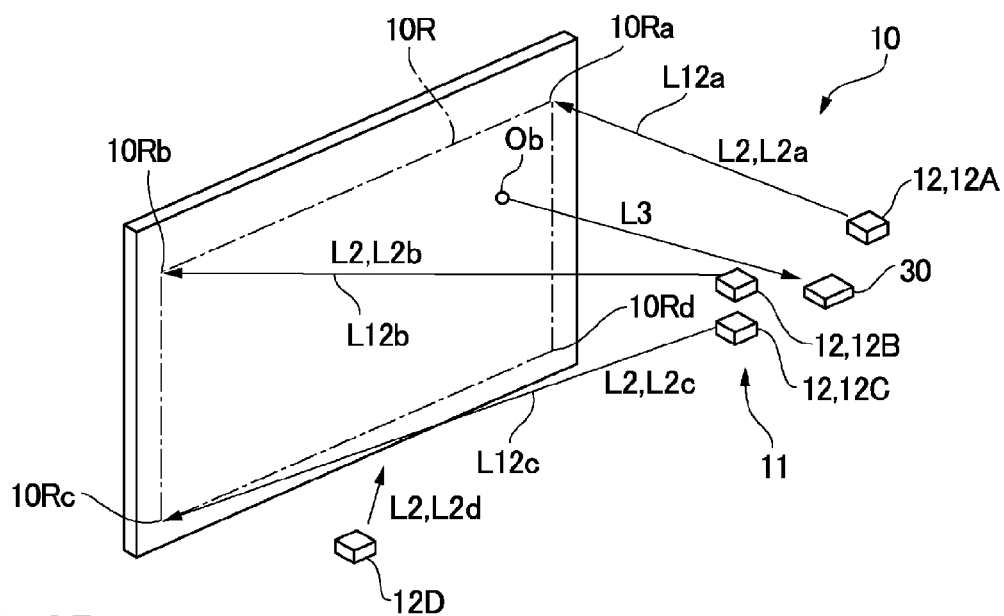

FIGS. 9A and 9B are explanatory diagrams schematically showing a configuration of the projection display device 100 with a position detection function according to a third embodiment of the invention, wherein FIG. 9A is an explanatory diagram schematically showing an appearance of a substantial part of the projection display device 100 with a position detection function viewed from a lateral side, and FIG. 9B is an explanatory diagram showing an overall configuration of the optical position detection device 10. It should be noted that since the basic configuration of the present embodiment is substantially the same as in the first embodiment, common parts are denoted with the same reference symbols and the explanation therefor will be omitted.

Similarly to the cases of the first through the third embodiments, also in the projection display device 100 with a position detection function shown in FIGS. 9A and 9B, the position detection light source section 11 disposed in the image projection device 200 is provided with the first light emitting element 12A for emitting the first position detection light beam L2a, the second light emitting element 12B for emitting the second position detection light beam L2b, and the third light emitting element 12C for emitting the third position detection light beam L2c. Further, in the present embodiment, there is further provided the fourth light emitting element 12D for emitting the fourth position detection light beam L2d, and the fourth position detection light beam L2d forms an intensity distribution different from those of the first position detection light beam L2a, the second position detection light beam L2b, and the third position detection light beam L2c.

Although FIGS. 9A and 9B show an example of disposing the fourth light emitting element 12D in a place separated from the image projection device 200 and at a position distant in the Z-axis direction from the first light emitting element 12A, the second light emitting element 12B, and the third light emitting element 12C, it is also possible to make the fourth light emitting element 12D be also included in the position detection light source section 11 provided to the image projection device 200 similarly to the first light emitting element 12A, the second light emitting element 12B, and the third light emitting element 12C as explained later in the modified example of the third embodiment.

Also in the projection display device 100 with a position detection function configured as described above, the X-Y coordinate of the object matter Ob is detected using the first position detection light beam L2a, the second position detection light beam L2b, and the third position detection light beam L2c, similarly to the case of the first embodiment.

In contrast thereto, when detecting the Z-coordinate of the object matter Ob, the Z-coordinate is detected using either one (e.g., the first position detection light beam L2a) of the first position detection light beam L2a, the second position detection light beam L2b, and the third position detection light beam L2c, and the fourth position detection light beam L2d. Here, since the intensity distribution of the first position detection light beam L2a in the Z-axis direction and the intensity distribution of the fourth position detection light beam L2d in the Z-axis direction can previously be figured out, it is possible to detect the ratio between the distance in the Z-axis direction between the object matter Ob and the first light emitting element 12A and the distance in the Z-axis direction between the object matter Ob and the fourth light emitting element 12D by comparing the detection result in the light detector 30 when emitting the first position detection light beam L2a and the detection result in the light detector 30 when emitting the fourth position detection light beam L2d. On this occasion, although the intensities of the first position detection light beam L2a and the fourth position detection light beam L2d in the Z-axis direction vary in the X-axis direction and the Y-axis direction, the X-Y coordinate of the object matter Ob has been detected using the first position detection light beam L2a, the second position detection light beam L2b, and the third position detection light beam L2c. Therefore, by performing the correction of the X-Y coordinate with respect to the ratio between the distance in the Z-axis direction between the object matter Ob and the first light emitting element 12A and the distance in the Z-axis direction between the object matter Ob and the fourth light emitting element 12D using the first position detection light beam L2a and the fourth position detection light beam L2d, the Z-coordinate of the object matter Ob can be detected.

Modified Example of Third Embodiment

Although in the third embodiment described above the fourth light emitting element 12D is disposed in the place separated from the image projection device 200, even in the case of including the fourth light emitting element 12D in the position detection light source section 11 disposed in the image projection device 200 similarly to the first light emitting element 12A, the second light emitting element 12B, and the third light emitting element 12C, the Z-coordinate can also be detected by a method similar to the third embodiment. On this occasion, from the view point of improving the detection accuracy of the Z-coordinate, it is preferable to dispose the fourth light emitting element 12D at a position distant from the first light emitting element 12A.

Fourth Embodiment

Figure 10A:
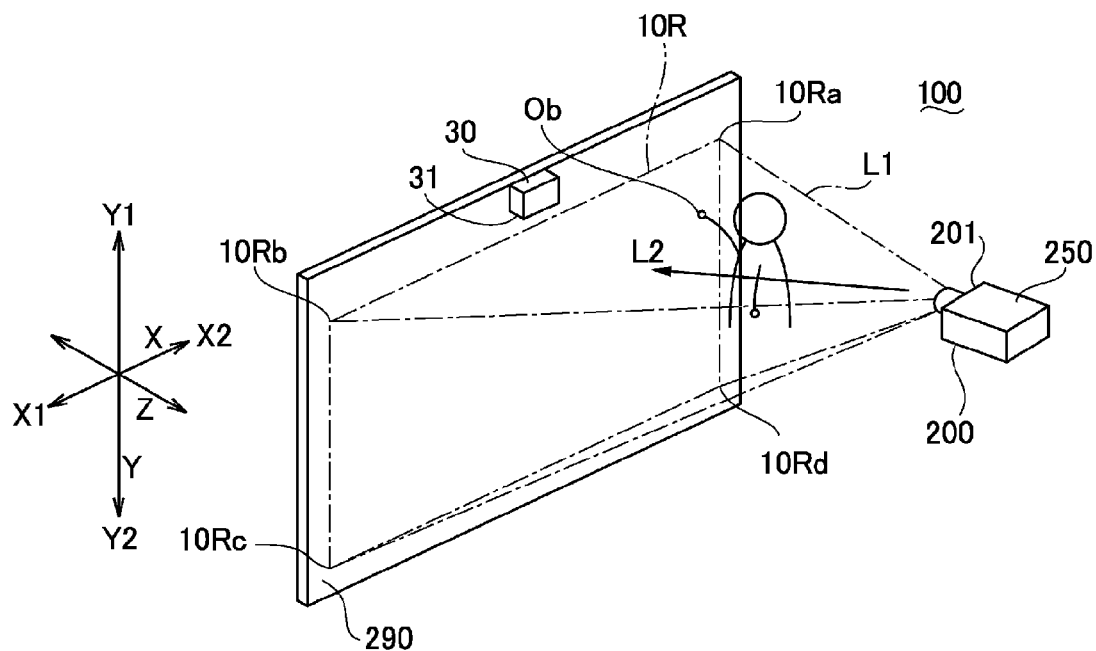
FIGS. 10A and 10B are explanatory diagrams schematically showing a configuration of a projection display device with a position detection function according to a fourth embodiment of the invention.
Figure 10B:
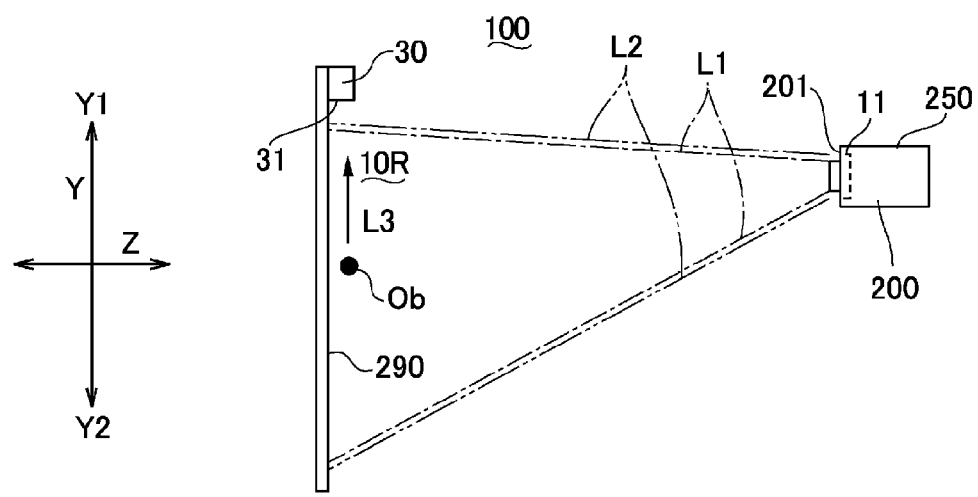

FIGS. 10A and 10B are explanatory diagrams schematically showing a configuration of a projection display device with a position detection function according to a fourth embodiment of the invention, wherein FIG. 10A is an explanatory diagram schematically showing an appearance of a substantial part of the projection display device with a position detection function viewed from obliquely above, and FIG. 10B is an explanatory diagram schematically showing an appearance thereof viewed from a lateral side. It should be noted that since the basic configuration of the present embodiment is substantially the same as in the first embodiment, common parts are denoted with the same reference symbols and the explanation therefor will be omitted.

Although in the first embodiment described above all of the position detection light source section 11, the light detector 30, and the position detection section 50 are disposed in the image projection device 200, in the present embodiment, as shown in FIGS. 10A and 10B, the light detector 30 is disposed at a position separate from the image projection device 200, namely a lateral side of the image projection device 200 or a lateral side of the detection area 10R. It should be noted that, also in the present embodiment, the position detection light source section 11 and the position detection section 50 are disposed in the image projection device 200.

Other Embodiments

Although in the first through fourth embodiments described above, when obtaining the X-Y coordinate the position detection light source section 11 emits the first position detection light beam L2a, the second position detection light beam L2b, and the third position detection light beam L2c at respective timing different from each other, it is also possible to configure that the infrared light beams (the position detection light beams) with wavelengths different from each other are used as some of the first position detection light beam L2a, the second position detection light beam L2b, and the third position detection light beam L2c, and the infrared light beams with the wavelengths different from each other are emitted simultaneously. In the case of realizing the configuration, it is enough to use a plurality of light detectors having the receiving wavelengths different from each other, and even if the infrared light beams with the wavelengths different from each other are emitted simultaneously, the infrared light beams can be received by such light detectors as described above.

Further, although the example using the three light emitting elements (light sources) is shown in the first embodiment, and the example using the four light emitting elements (light sources) is shown in the second and third embodiments described above, it is also possible to emit the first position detection light beam L2a, the second position detection light beam L2b, and the third position detection light beam L2c from a common light source. Also in this case, by adopting the configuration of switching the direction in which the position detection light beams are emitted from the common light source, or the configuration of disposing the light blocking mask having a translucent section for forming the intensity distribution on the front of the common light source and switching the position of the mask, it is possible to sequentially emit the first position detection light beam L2a, the second position detection light beam L2b, and the third position detection light beam L2c.

Further, it is also possible to emit the Z-coordinate detecting position detection light beam having the intensity, which is constant in the X-axis direction and the Y-axis direction and varies in the Z-axis direction, from the common light source.

The disclosure of Japanese Patent Application No. 2009-254707, filed Nov. 6, 2009 is expressly incorporated by reference herein.

What is claimed is:

1. A projection display device having an image projection device adapted to project an image on a surface, and a position detection function of optically detecting a position of an object matter located between the surface and the image projection device, the projection display device comprising:
the image projection device;
a position detection light source section disposed in the image projection device, and adapted to emit position detection light beams toward the object matter;
a light detector adapted to detect the position detection light beams reflected by the object matter; and
a position detection section adapted to detect the position of the object matter in an imaginary plane intersecting emission directions of the position detection light beams based on a light reception result of the light detector,
wherein the position detection light source section emits, as the position detection light beams,
a first position detection light beam having a first intensity distribution,
a second position detection light beam having a second intensity distribution having a highest intensity portion at a position failing to overlap a highest intensity portion of the first intensity distribution viewed from the image projection device, and
a third position detection light beam having a third intensity distribution having a highest intensity portion at a position failing to overlap an imaginary straight line connecting the highest intensity portion of the first intensity distribution and the highest intensity portion of the second intensity distribution viewed from the image projection device.

2. The projection display device with a position detection function according to claim 1, wherein
in each of the first intensity distribution, the second intensity distribution, and the third intensity distribution, the intensity decreases monotonically as distance from the highest intensity portion increases.

3. The projection display device with a position detection function according to claim 1, wherein
the position detection light source section emits the first position detection light beam, the second position detection light beam, and the third position detection light beam at respective timing different from each other.

4. The projection display device with a position detection function according to claim 1, wherein
the position detection light beams are each made of infrared light.

5. The projection display device with a position detection function according to claim 1, wherein
the position detection light source section includes a first light source adapted to emit the first position detection light beam, a second light source adapted to emit the second position detection light beam, and a third light source adapted to emit the third position detection light beam.

6. The projection display device with a position detection function according to claim 5, wherein
the first light source, the second light source, and the third light source emit the first position detection light beam, the second position detection light beam, and the third position detection light beam as diverging light beams.

7. The projection display device with a position detection function according to claim 6, wherein
a detection area where the object matter is detected is set between the surface on which the image is projected and the image projection device, and
the first light source, the second light source, and the third light source have respective light axes oriented in directions passing through ends of the detection area.

8. The projection display device with a position detection function according to claim 5, further comprising:
a fourth light source adapted to emit a fourth position detection light beam having an intensity distribution different from those of the first position detection light beam, the second position detection light beam, and the third position detection light beam,
wherein the position detection section detects the position of the object matter in the emission direction of the position detection light beam based at least on a light reception result of the light detector when emitting the fourth position detection light beam.

9. The projection display device with a position detection function according to claim 8, wherein
the fourth light source is disposed in the image projection device.

10. The projection display device with a position detection function according to claim 8, wherein
the fourth light source is disposed in a place separate from the image projection device.

11. The projection display device with a position detection function according to claim 1, wherein
the position detection light source section emits a position detection light beam having an intensity varying in an emission direction of the position detection light beam, and
the position detection section detects the position of the object matter in the emission direction of the position detection light beam based on a light reception result of the light detector when emitting the position detection light beam.

12. The projection display device with a position detection function according to claim 1, wherein
the position detection light source section, the light detector, and the position detection section are all disposed in the image projection device.

* * * * *